(12) United States Patent
Proksch

(10) Patent No.: US 8,763,475 B2
(45) Date of Patent: Jul. 1, 2014

(54) ACTIVE DAMPING OF HIGH SPEED SCANNING PROBE MICROSCOPE COMPONENTS

(71) Applicant: Roger Proksch, Santa Barbara, CA (US)

(72) Inventor: Roger Proksch, Santa Barbara, CA (US)

(73) Assignee: Oxford Instruments Asylum Research Corporation, Goleta, CA (US)

(*) Notice: Subject to any disclaimer, the term of this patent is extended or adjusted under 35 U.S.C. 154(b) by 0 days.

(21) Appl. No.: 13/669,282

(22) Filed: Nov. 5, 2012

(65) Prior Publication Data

US 2013/0061356 A1    Mar. 7, 2013

Related U.S. Application Data

(62) Division of application No. 11/678,018, filed on Feb. 22, 2007, now Pat. No. 8,302,456.

(60) Provisional application No. 60/776,385, filed on Feb. 23, 2006.

(51) Int. Cl.
| | |
|---|---|
| *F16F 7/10* | (2006.01) |
| *G01L 5/00* | (2006.01) |
| *G01Q 10/04* | (2010.01) |
| *G01Q 70/04* | (2010.01) |
| *G01Q 10/06* | (2010.01) |

(52) U.S. Cl.
CPC ............ *F16F 7/1011* (2013.01); *G01Q 10/065* (2013.01); *G01Q 70/04* (2013.01); *G01L 5/0061* (2013.01); *G01L 5/0038* (2013.01)
USPC ............... 73/862.541; 73/430; 850/4; 850/54

(58) Field of Classification Search
CPC ....... B82Y 35/00; F16F 7/1011; G01D 11/00; G01L 5/00; G01L 5/0038; G01L 5/0061; G01Q 10/065; G01Q 30/20; G01Q 70/04
USPC ............... 73/1.08, 1.15, 1.79, 1.89, 105, 430, 73/862.541, 862.59, 862.61, 862.622; 850/1, 3–5, 8, 18, 33, 39, 54
See application file for complete search history.

(56) References Cited

U.S. PATENT DOCUMENTS

| 41,612 A | 2/1864 | Ericsson |
|---|---|---|
| 284,827 A | 9/1883 | Elwell |

(Continued)

FOREIGN PATENT DOCUMENTS

| DE | 29612349 U1 | 11/1997 |
|---|---|---|
| EP | 0509911 | 10/1992 |

(Continued)

OTHER PUBLICATIONS

International Preliminary Report on Patentability, PCT/US2007/062760, report issued Aug. 26, 2008.*

(Continued)

*Primary Examiner* — Thomas P Noland
(74) *Attorney, Agent, or Firm* — Law Office of Scott C. Harris, Inc.

(57) ABSTRACT

A technique for actively damping internal vibrations in a scanning probe microscope is disclosed. The excitation of various mechanical movements, including resonances, in the mechanical assembly of an SPM can adversely effect its performance, especially for high speed applications. An actuator is used to compensate for the movements. The actuator may operate in only the z direction, or may operate in other directions. The actuator(s) may be located at positions of antinodes.

16 Claims, 12 Drawing Sheets

(56) References Cited

U.S. PATENT DOCUMENTS

| | | |
|---|---|---|
| 2,964,272 A | 12/1960 | Olson |
| 3,701,499 A | 10/1972 | Schubert et al. |
| 3,807,678 A | 4/1974 | Karnopp et al. |
| 4,080,636 A | 3/1978 | Ravizza |
| 4,083,433 A | 4/1978 | Geohegan, Jr. et al. |
| 4,122,303 A | 10/1978 | Chaplin et al. |
| 4,153,815 A | 5/1979 | Chaplin et al. |
| 4,343,993 A | 8/1982 | Binnig et al. |
| 4,417,098 A | 11/1983 | Chaplin et al. |
| 4,473,906 A | 9/1984 | Warnaka et al. |
| 4,477,505 A | 10/1984 | Warnaka |
| 4,489,441 A | 12/1984 | Chaplin |
| 4,490,841 A | 12/1984 | Chaplin et al. |
| 4,527,282 A | 7/1985 | Chaplin et al. |
| 4,562,589 A | 12/1985 | Warnaka et al. |
| 4,566,118 A | 1/1986 | Chaplin et al. |
| 4,600,863 A | 7/1986 | Chaplin et al. |
| 4,615,504 A | 10/1986 | Sandercock |
| 4,626,730 A | 12/1986 | Hubbard, Jr. |
| 4,635,892 A | 1/1987 | Baker |
| 4,665,549 A | 5/1987 | Eriksson et al. |
| 4,677,676 A | 6/1987 | Eriksson |
| 4,677,677 A | 6/1987 | Eriksson |
| 4,724,318 A | 2/1988 | Bennig |
| 4,736,431 A | 4/1988 | Allie et al. |
| 4,742,998 A | 5/1988 | Schubert |
| 4,750,721 A | 6/1988 | Sasada |
| 4,757,980 A | 7/1988 | Schubert |
| 4,796,873 A | 1/1989 | Schubert |
| 4,811,309 A | 3/1989 | Eriksson et al. |
| 4,815,139 A | 3/1989 | Eriksson et al. |
| 4,821,205 A | 4/1989 | Schutten et al. |
| 4,837,834 A | 6/1989 | Allie |
| 4,838,392 A | 6/1989 | Miller et al. |
| 4,862,506 A | 8/1989 | Landgarten et al. |
| 4,878,188 A | 10/1989 | Ziegler, Jr. |
| 4,887,699 A | 12/1989 | Ivers et al. |
| 4,898,264 A | 2/1990 | Miller |
| 4,903,247 A | 2/1990 | Van Gerwen et al. |
| 4,903,249 A | 2/1990 | Hoops et al. |
| 4,907,680 A | 3/1990 | Wolfe et al. |
| 4,921,272 A | 5/1990 | Ivers |
| 4,936,425 A | 6/1990 | Boone et al. |
| 4,947,435 A | 8/1990 | Taylor |
| 4,953,089 A | 8/1990 | Wolfe |
| 4,977,600 A | 12/1990 | Ziegler |
| 4,987,598 A | 1/1991 | Eriksson |
| 4,989,684 A | 2/1991 | Conaway |
| 4,993,523 A | 2/1991 | Schwemmer et al. |
| 5,000,415 A | 3/1991 | Sandercock |
| 5,004,079 A | 4/1991 | Ivers et al. |
| 5,052,529 A | 10/1991 | Sutcliffe et al. |
| 5,060,519 A | 10/1991 | Chojitani et al. |
| RE33,937 E | 5/1992 | Schubert |
| 5,109,939 A | 5/1992 | Conaway et al. |
| 5,174,552 A | 12/1992 | Hodgson et al. |
| 5,178,357 A | 1/1993 | Platus |
| 5,182,887 A | 2/1993 | Uno et al. |
| 5,214,342 A | 5/1993 | Yang |
| 5,253,853 A | 10/1993 | Conaway et al. |
| 5,255,764 A | 10/1993 | Kurabayashi et al. |
| 5,299,184 A | 3/1994 | Yamano et al. |
| 5,310,157 A | 5/1994 | Platus |
| 5,315,203 A | 5/1994 | Bicos |
| 5,329,122 A | 7/1994 | Sakai et al. |
| 5,370,352 A | 12/1994 | Platus |
| 5,371,727 A | 12/1994 | Shido et al. |
| 5,374,025 A | 12/1994 | Whelpley et al. |
| 5,378,974 A | 1/1995 | Griffin |
| 5,379,657 A | 1/1995 | Hasselman et al. |
| 5,390,121 A | 2/1995 | Wolfe |
| 5,390,892 A | 2/1995 | Platus |
| 5,426,631 A | 6/1995 | Miyazaki et al. |
| 5,479,386 A | 12/1995 | Takeshita et al. |
| 5,485,451 A | 1/1996 | Yamano et al. |
| 5,526,334 A | 6/1996 | Yamano et al. |
| 5,635,848 A * | 6/1997 | Hammond et al. ...... 324/750.22 |
| 5,660,255 A | 8/1997 | Schubert et al. |
| 5,680,387 A | 10/1997 | Yamano et al. |
| 5,714,682 A | 2/1998 | Prater et al. |
| 5,714,831 A | 2/1998 | Walker et al. |
| 5,729,015 A | 3/1998 | Tong |
| 5,751,684 A | 5/1998 | Takeda et al. |
| 5,783,899 A | 7/1998 | Okazaki |
| 5,786,654 A | 7/1998 | Yoshida et al. |
| 5,805,541 A | 9/1998 | Takeda et al. |
| 5,811,821 A | 9/1998 | Alexander et al. |
| 5,826,864 A | 10/1998 | Barger |
| 5,831,961 A | 11/1998 | Sakai et al. |
| 5,973,440 A | 10/1999 | Nitzsche et al. |
| 5,975,508 A | 11/1999 | Beard |
| 6,029,959 A * | 2/2000 | Gran et al. ...................... 267/136 |
| 6,141,188 A | 10/2000 | Bauck et al. |
| 6,163,429 A | 12/2000 | Tousain et al. |
| 6,193,206 B1 | 2/2001 | Yasuda et al. |
| 6,209,841 B1 | 4/2001 | Houghton, Jr. et al. |
| 6,215,121 B1 | 4/2001 | Fujihira et al. |
| 6,246,054 B1 | 6/2001 | Toda et al. |
| 6,257,053 B1 | 7/2001 | Tomita et al. |
| 6,272,924 B1 * | 8/2001 | Jansen ....................... 73/379.01 |
| 6,278,113 B1 | 8/2001 | Murayama et al. |
| 6,304,409 B1 | 10/2001 | Allsup |
| 6,310,746 B1 | 10/2001 | Hawwa et al. |
| 6,323,483 B1 | 11/2001 | Cleveland et al. |
| 6,354,576 B1 | 3/2002 | Jacobs et al. |
| 6,378,672 B1 | 4/2002 | Wakui |
| 6,394,407 B1 | 5/2002 | Ryaboy |
| 6,438,461 B1 | 8/2002 | Desailly et al. |
| 6,459,088 B1 | 10/2002 | Yasuda et al. |
| 6,477,908 B1 | 11/2002 | Wakui |
| 6,511,035 B1 | 1/2003 | Teel et al. |
| 6,516,130 B1 | 2/2003 | Jang |
| 6,530,268 B2 | 3/2003 | Massie |
| 6,552,339 B1 | 4/2003 | Gupta et al. |
| 6,568,666 B2 | 5/2003 | Houghton, Jr. |
| 6,570,298 B2 | 5/2003 | Yasuda |
| 6,580,852 B2 | 6/2003 | Iyoki |
| 6,593,997 B1 | 7/2003 | Watson et al. |
| 6,601,524 B2 | 8/2003 | Janata et al. |
| 6,603,531 B1 | 8/2003 | Binnard |
| 6,608,959 B2 | 8/2003 | Jang et al. |
| 6,614,601 B2 | 9/2003 | Dallakian |
| 6,617,761 B2 | 9/2003 | Ando et al. |
| 6,619,611 B2 | 9/2003 | Ryaboy et al. |
| 6,626,411 B2 | 9/2003 | Houghton, Jr. et al. |
| 6,655,840 B2 | 12/2003 | Nunnally |
| 6,674,600 B1 | 1/2004 | Codilian et al. |
| 6,681,152 B1 | 1/2004 | Remington et al. |
| 6,724,466 B2 | 4/2004 | Ono et al. |
| 6,757,053 B1 | 6/2004 | Hazelton et al. |
| 6,791,058 B2 | 9/2004 | Heitel et al. |
| 6,809,306 B2 | 10/2004 | Ando et al. |
| 6,810,720 B2 | 11/2004 | Adderton et al. |
| 6,861,649 B2 | 3/2005 | Massie |
| 6,874,748 B2 | 4/2005 | Hanagan |
| 6,885,430 B2 | 4/2005 | Tanaka et al. |
| 6,958,808 B2 | 10/2005 | Tanaka et al. |
| 7,038,443 B2 | 5/2006 | Proksch et al. |
| 7,233,140 B2 | 6/2007 | Proksch et al. |
| 2002/0104950 A1* | 8/2002 | Mayama ....................... 248/638 |
| 2002/0175677 A1 | 11/2002 | Proksch et al. |
| 2003/0209060 A1 | 11/2003 | Proksch |
| 2004/0056653 A1 | 3/2004 | Bocek et al. |
| 2004/0075428 A1 | 4/2004 | Proksch et al. |
| 2004/0079142 A1 | 4/2004 | Proksch |
| 2004/0089178 A1* | 5/2004 | Muller et al. ................. 101/408 |
| 2004/0206166 A1 | 10/2004 | Proksch et al. |
| 2004/0255651 A1* | 12/2004 | Adderton et al. ................ 73/105 |
| 2006/0186876 A1 | 8/2006 | Proksch et al. |
| 2006/0186877 A1 | 8/2006 | Proksch et al. |
| 2006/0186878 A1 | 8/2006 | Proksch et al. |
| 2006/0192551 A1 | 8/2006 | Proksch |

(56) References Cited

U.S. PATENT DOCUMENTS

| | | | |
|---|---|---|---|
| 2006/0202683 A1 | | 9/2006 | Proksch et al. |
| 2007/0089533 A1* | | 4/2007 | Englund et al. ............ 73/862.01 |
| 2010/0186560 A1* | | 7/2010 | Tzschentke et al. ........... 82/1.11 |

FOREIGN PATENT DOCUMENTS

| | | | | |
|---|---|---|---|---|
| EP | 0556033 | | 8/1993 | |
| EP | 0579182 | | 1/1994 | |
| FR | 2637663 | | 4/1990 | |
| GB | 222657 | | 3/1990 | |
| GB | 2229511 | | 9/1990 | |
| GB | 2229789 | | 10/1990 | |
| GB | 2230920 | | 10/1990 | |
| GB | 2277360 | | 10/1994 | |
| JP | 02102945 | | 4/1990 | |
| JP | 03292493 | | 12/1991 | |
| JP | 04339019 | | 11/1992 | |
| JP | 05149379 | | 6/1993 | |
| JP | 05346136 | | 12/1993 | |
| JP | 08312715 | A | 11/1996 | |
| JP | 10141428 | A | 5/1998 | |
| JP | 11268558 | A * | 10/1999 | ............ B60K 31/00 |
| JP | 2004211741 | A * | 7/2004 | ............ F16F 15/02 |
| JP | 2006037995 | A | 2/2006 | |
| SU | 1765571 | | 9/1992 | |
| WO | 9002447 | | 3/1990 | |
| WO | 9003026 | | 3/1990 | |
| WO | WO 2005023614 | A2 * | 3/2005 | ............... B60T 8/00 |

OTHER PUBLICATIONS

Anezykowski, B., et al., "Analysis of the Interaction Mechanisms in Dynamic Mode SFM by Means of Experimental Data and Computer Simulation," Applied Physics A, vol. 66, pp. S885-S889, (1998).
Ando T., et al., "A High-Speed Atomic Force Microscope for Studying Biological Macromolecules in Action," Chem. Phys. Chem., vol. 4, pp. 1196-1202 (2003).
Ando, T., et al., "A High-Speed Atomic Force Microscope for Studying Biological Macromolecules in Action," Jpn. J. Appl. Phys., Part 1, 41 (7B):4851-4856, Jul. 2002.
Ando, T., et al., "A High-Speed Atomic Force Miscroscope for Studying Biological Macromolecules in Action," Proc. Natl. Acad. Sci., 98(22):12468-12472, Oct. 2001.
Antognozzi, M., et al., Increasing Shear Force Microscopy Scanning Rate Using Active Quality-Factor Control, Apply. Phys. Lett., 82(17):2761-2763, Apr. 2003.
Binnig, G. et al., "Atomic Force Microscope," Phys. Rev. Lett., 56(9):930-933, Mar. 1986.
Cleveland, J.P., et al., "A Nondestructive Method for Determining the Spring Constant of Cantilevers for Scanning Force Microscopy," Rev. Sci. Instrum., 64(2):403-405, Feb. 1993.
Curtis, R., et al., "An Ultrahigh Vacuum High Speed Scanning Tunneling Microscope," Rev. Sci. Instrum., 68(7):2790-2796, Jul. 1997.
Furutani, K., et al., "Displacement Control of Piezoelectric Element by Feedback of Induced Charge," Nanotechnology, vol. 9, pp. 93-98 (1998).
Humphris, A.D.L., et al., "Ultrahigh-Speed Scanning Near-Field Optical Microscopy Capable of Over 100 Frames Per Second," Appl. Phys. Lett., 83(1):6-8, Jul. 2003.
Kindt, J.H., et al., "Rigid Design of Fast Scanning Probe Microscopes Using Finite Element Analysis," Ultramicroscopy, vol. 100, pp. 259-265 (2004).
Kitazawa, M., et al., "Batch Fabrication of Sharpened Silicon Nitride Tips," Jpn. J. Appl. Phys. Part 1, 42(7B):4844-4847, Jul. 2003.
Kodera, N., et al., "Active Damping of the Scanner for High-Speed Atomic Force Microscopy," Rev. Sci. Instrum., 76(5):053708(1-5), Apr. 2005.
Michely, T., et al., "Plug 'n' Play Scanning Probe Microscopy," Rev. Sci. Instrum., 71(12):4461-4467, Dec. 2000.
Newcomb, C.V., et al., "Improving the Linearity of Piezoelectric Ceramic Actuators," Electronics Letters, 18(11):442-444, May 1982.
Park, S., et al., "Scanning Tunneling Microscope," Rev. Sci. Instrum., 58(11):2010-2017, Nov. 1987.
Rogers, B., et al., "High Speed Tapping Mode Atomic Force Microscopy in Liquid Using an Insulated Piezoelectric Cantilever," Rev. Sci. Instrum., 74(11):4683-4686, Nov. 2003.
Schitter, G., et al., "High Performance Feedback for Fast Scanning Atomic Force Microscopes," Rev. Sci. Instrum., 72(8):3320-3327, Aug. 2001.
Sulchek, T., et al., "Characterization and Optimization of Scan Speed for Tapping-Mode Atomic Force Microscopy," Rev. Sci. Instrum., 73(8):2928-2936, Aug. 2002.
Sulchek, T., et al., "High-Speed Atomic Force Miscroscopy in Liquid," Rev. Sci. Instrum., 71(5):2097-2099, May 2000.
Tamayo, J., et al., "Chemical Sensors and Biosensors in Liquid Environment Based on Microcantilevers with Amplified Quality Factor," Ultramicroscopy, vol. 86, pp. 167-173 (2001).
Tamayo, J., et al., "Piconewton Regime Dynamic Force Miscroscopy in Liquid," Applied Physics Letters, 77(4):582-584, Jul. 2000.
Viani, M.B., et al., "Fast Imaging and Fast Force Spectroscopy of Single Biopolymers with a New Atomic Force Miscrscope Designed for Small Cantilevers," Rev. Sci. Instrum., 70(11):4300-4303, Nov. 1999.
Viani, M.B., et al., "Probing Protein-Protein Interactions in Real Time," Nat. Struct. Biol., 7(8):644-647, Aug. 2000.
Viani, M.B., et al., "Small Cantilevers for Force Spectroscopy of Single Molecules," J. of Appl. Phys., 86(4):2258-2262, Aug. 1999.

* cited by examiner

FIG. 12A  FIG. 12B

ACTIVE DAMPING OF HIGH SPEED SCANNING PROBE MICROSCOPE COMPONENTS

CROSS-REFERENCE TO RELATED APPLICATIONS

This application is a divisional application of U.S. application Ser. No. 11/678,018 filed Feb. 22, 2007, which claims priority to U.S. Provisional Application No. 60/776,385, filed on Feb. 23, 2006. The disclosure of the prior application is considered part of (and is incorporated by reference in) the disclosure of this application.

BACKGROUND

An atomic force microscope is a device used to produce images of surface topography (and other sample characteristics) based on information obtained from rastering a sharp probe on the end of a cantilever relative to the surface of a sample. Deflections of the cantilever, or changes in its oscillation which are detected while rastering correspond to topographical (or other) features of the sample. Deflections or changes in oscillation are typically detected by an optical lever arrangement whereby a light beam is directed onto a cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever typically trigger a change in the vertical position of the cantilever base relative to the sample, in order to maintain the deflection or oscillation at a constant pre-set value. This feedback generates the image from the atomic force microscope, called an AFM image.

Atomic force microscopes can be operated in a number of different imaging modes. In contact mode, the tip of the cantilever is in constant contact with the sample surface. In oscillatory modes, the tip makes no contact or only intermittent contact with the surface.

FIG. 1 shows one prior art approach to the use of actuators in an atomic force microscope. A sample 1 is attached to a z-actuator 2. The base 7 of a flexible cantilever 6 is attached to xy-actuator 8 which is attached to a head frame 9 ("xy" here represents that the actuator moves in the horizontal XY plane, and "z" represents that the actuator moves in the vertical direction, "X" and "Y" and "Z" being mutually orthogonal directions). The xy-actuator 8, combined with the z-actuator 2, provides relative motion between the probe 5 and the sample 1 in all three dimensions. The z-actuator 2 is supported by a structure 3 attached to the frame 4 of the instrument. The cantilever 6 deflects in response to interactions between the probe 5 and the sample 1. This deflection is measured by a PSD 10. The output of the PSD 10 is collected by the controller 11. Typically, the controller 11 performs some processing of the signal, extracting quantities such as the cantilever deflection, amplitude, phase or other parameters. These values are often displayed on a display device 12. Furthermore, the controller 11 can operate a feedback loop that in turn varies the relative position of the base 7 of the cantilever 6 and the sample 1 in response to sample characteristics.

Accurate characterization of a sample by an atomic force microscope is often limited by the ability of the atomic force microscope to move the base of the cantilever vertically in the Z direction relative to the sample surface at a rate sufficient to characterize the sample accurately while scanning in either the X or Y direction.

This movement rate is often expressed in terms of bandwidth. The bandwidth required depends on the desired image size (in pixels) and acquisition rate of each pixel. Table 1 below shows the bandwidth required for various imaging scenarios. For example, completing a 256.times.256 pixel image in one second requires a bandwidth of 131 kHz.

TABLE-US-00001 TABLE 1 Closed loop bandwidths (BW) required for high speed atomic force microscope imaging. Closed Loop bandwidths Required (kHz) Images/Second 128.sup.2 Pixels 256.sup.2 Pixels 512.sup.2 Pixels 0.1 1.64 6.5 52.4 0.2 3.3 13 104 1 16.4 131 524 5 81.9 328 2620 10 164 655 5240

In order to accurately measure the height of all features, both large and small, on a sample surface, the z-actuator must have the ability to provide relative motion between the base of the cantilever and sample surface over a large range of heights, i.e., it must have large vertical travel. The z-actuator can be a scanning tube in many conventional Atomic force microscopes. In other microscopes, such as the Asylum Research MFP-3D atomic force microscope, the z-actuator is a flexure. The parts must be large enough to move the cantilever up and down sufficiently to measure even the largest surface features.

The range of actuation of many actuators scales with the physical dimensions of the device. This is certainly the case with piezo actuators. For example, in the case of commercially available piezo stack actuators from TOKIN Incorporated, the maximum travel range is nominally 4.6 um, 9.1 um and 17.4 um for stacks having respective lengths of 5 mm, 10 mm and 20 mm. Accordingly, a by-product of increasing the travel range, is that actuators become more massive. These more massive actuators move more slowly.

One way of characterizing the speed of actuator movement is the resonant frequency of the actuator. The piezo stacks mentioned above have resonant frequencies of roughly 261 kHz, 138 kHz and 69 kHz respectively. It may be noted that the piezo material used in these three stacks is the same. The change in resonant frequency is primarily due to the different sizes and therefore masses.

The quoted resonant frequencies are for the bare stacks. Attaching these bare stacks to a support structure or incorporating them in a flexure will substantially further reduce the resonant frequency. Furthermore, attaching any mass to the piezo will further reduce the resonant frequency.

In practice, this means that the actuator may not be able to move either the sample or the base of the cantilever rapidly enough to track the surface accurately. This can lead to either the sample and/or probe being damaged, or to the reproduction of the surface topography being less accurate. In order to avoid these consequences, an atomic force microscope operator will typically decrease the scan rate in the X and Y directions until the z-actuator can accommodate the topographical variations in the sample.

Typically, an atomic force microscope operator begins by increasing the feedback loop gain to increase the response of the z-actuator. However, at some point, the z-actuator will begin to resonate and that resonant motion will create parasitic oscillations in the actuator support structure and even change the phase of the response of the actuator to inputs. These parasitic oscillations and phase changes reduce the performance of the instrument and the quality of the images and other data produced.

The actuation scheme depicted in FIG. 1 is representative of a great number of actuation schemes commonly used to provide relative movement between a tip and sample. This may provide a useful model for analyzing what happens when the atomic force microscope operator increases the feedback loop gain to increase the response of the z-actuator. Increasing the feedback loop gain increases the extension of the z-actuator 2 in the vertical or Z direction. This increased extension, however, results in an increased reaction force on the support structure 3.

FIG. 2 constitutes the lower-left segment of FIG. 1, showing this in more detail. In FIG. 2, as in FIG. 1 the sample 1 is supported by the z-actuator 2. FIG. 2—Reaction Forces shows the z-actuator 2 extending and moving the sample 1*a* distance .DELTA.Z.sub.sam. This movement requires a force F.sub.sam is exerted on the sample to cause acceleration of the sample. Newton's second law implies there is a corresponding reaction force F.sub.sup exerted on the support structure 3. This reaction force will cause some deflection in the support structure, .DELTA.Z.sub.sup. Flexing of the support structure leads to ringing, reduced motion of the sample (.DELTA.Z.sub.sam) and generally reduced bandwidth of sample actuation.

One approach to overcoming the consequences of speeding up image acquisition has been to allow the cantilever error signal to vary over the scan range, but to keep the average value at a setpoint (Albrecht and Quate). With this approach, the job of the feedback loop is made much easier, allowing faster scanning. However, large variations in the error parameter using this technique may have detrimental effects, including but not limited to tip dulling or damage and sample damage.

Another approach has been to use "nested" actuators. A large, relatively long-range and slow actuator is used along with a small, short range but much faster actuator. This allows images to be obtained at higher speeds because the small fast actuator can accommodate small surface variations while the large actuator takes care of the gross height variations over the entire XY scan range. One example of this approach is the zinc oxide piezo actuators integrated into cantilevers by Sulchek et al. and Rogers et al. These actuated cantilevers, together with the typical actuators controlling the distance between the cantilever base and the sample surface, allows the effective distance between the base of the cantilever and the surface of the sample to be maintained constant at the same time that the cantilever probe characterized the sample. Using these cantilevers, a bandwidth of 38 kHz has been demonstrated.

The actuated cantilever approach raises some difficulties. Combining fast and slow feedback loops is not always trivial. Tuning two feedback loops is significantly more time consuming and problematic than tuning a single loop. The scan speed gain is often rather moderate considering the complexity required of the operator. Combining the final data to obtain an accurate characterization of the sample is also more complicated and prone to instrumentation errors and artifacts. Actuated cantilevers are necessarily quite stiff, making imaging of soft samples problematic. Imaging in fluids, one of the strengths of the atomic force microscope, is difficult to implement with actuated cantilevers because of the requirements for electrical contacts directly to the cantilever. Changing the sample to one with a mass different than the design value of the actuated cantilever may seriously degrade its ability to overcome the effects of fast image acquisition. Finally, even actuated cantilevers have a resonance, a property which of course induces parasitic oscillations and phase shifts and therefore reduces data quality and leads to cantilever and/or sample damage.

Another approach to minimizing parasitic oscillations and phase shifts while speeding up atomic force microscope image acquisition is to construct the actuators in a recoilless, balanced arrangement where there is essentially no momentum transferred to the frame of the instrument. Typically, this arrangement includes the use of additional damping material to correct for any small discrepancies in the design, construction or material properties of the balanced actuators. The balanced actuator approach has been used by Cleveland et al., Ando et al. and Massie. A weakness is that the system is an open loop system. If, for example, the actuated mass changes, as is common when the sample is changed, or if the piezo sensitivity changes, as commonly happens with age, the balancing will become less and less effective.

FIG. 3 depicts the balance actuator approach. As with FIG. 1, a sample 1 is attached to a z-actuator 2 and the z-actuator is supported by a support structure 3 attached to the frame of the instrument 4. In this case however, there is a secondary z-actuator 13 positioned below the support structure 3 and an optional mass 14 attached to the secondary z-actuator 13. In addition, there can be a variable gain drive 15 for the secondary actuator. The z-actuator 2, as well as the secondary z-actuator 13 with variable gain drive 15 are driven with similar (or the same) feedback signal. The gain provided by variable gain drive 15 and the mass 14 are chosen so that the momentum transferred to the support structure 3 is substantially zero. Specifically, the force exerted on the support structure 3 by the base of the z-actuator 2 is equal and opposite to that exerted by the base of the secondary z-actuator 13.

Analogous operations can also be accomplished in a number of other ways, including using balanced flexures. See U.S. Pat. Nos. 6,459,088 B1 and 6,323,483 B1 for a host of methods all with the goal of reducing the momentum transferred to the support to essentially zero. This method has also been used with a number of variations by the group of Ando.

The balanced actuator approach of FIG. 3 is an open-loop system in which the design is carefully focused on balancing opposed actuators and thereby avoiding the excitation of resonances in the support structure. An open loop system however presents disadvantages. Experimental results of systems such as that in FIG. 3 have shown that if the mass of the sample 1 changes, as commonly occurs in atomic force microscope operation, the balancing condition will no longer be met and momentum will be transferred to the support structure 3 by the movements of actuators 2 and 13. This in turn induces the very resonances the approach seeks to avoid. Furthermore, the sensitivity of actuators can change over time or in response to environmental conditions, and this too also introduces these problems. Finally, the open loop, balanced approach requires very thorough manufacturing control.

The modifications in the balanced actuator approach recently proposed by Ando, attempt to overcome these disadvantages by including a model of the drive or "dummy" actuator (as they referred to it in their work) in the drive of the otherwise open loop actuators 2 and 13. However this solution has its own disadvantages when the behavior of either of the actuators begins to deviate from the "dummy" actuator. Ando's modifications provide no mechanism to measure and automatically correct the motion of the compensating system for the new actuator behavior.

A recent approach to the problem of speeding up image acquisition without inducing parasitic oscillations and phase shifts is that of Kodera et al. They have proposed a method of damping the resonances of a balanced scanner based on Q-control ideas. Their method introduces a "mock scanner" into the drive circuit for the z-actuator which in turn allows the phase of the drive to be adjusted to reduce the amplitude of the actuator resonances. This approach suffers from the limitation that the behavior of the actuator has to be preprogrammed and if its characteristics change, the damping effects will no longer function optimally, if at all.

SUMMARY

Apparatus for actively damping the effects of inertial forces internal to the instrument created by the use of fast actuators in the operation of cantilever-based instruments, and methods for using such apparatus are disclosed herein.

The systems and techniques described herein provide a novel sample and\or probe holder for cantilever-based instruments, particularly Atomic force microscopes, that permits the probe to measure the height of small surface features.

Systems and techniques provided herein allow for damping of the effects of inertial forces internal to the instrument created by an actuator, and does so in a seamless manner that is preferentially invisible to an operator and that is easier to manufacture than other. The damping is accomplished in a judicious manner, based on intelligent interpretation of measurements of the reaction of the apparatus to forces created by an actuator and then compensation for those measured forces.

In one aspect, the techniques and systems for implementing those techniques provide a novel cantilever-based instrument that permits more accurate imaging of surface features at high scan rates.

In another aspect, these developments provide a cantilever-based instrument that can measure sample features at high scan rates by reducing parasitic oscillations in internal structure of the instrument.

In another aspect, the developments described here allow parasitic oscillations created by the fast z-actuator in a cantilever-based instrument to be damped out, allowing improved performance.

In yet another aspect of the operation mode and instrumentation described here, it is possible to provide a fast actuator of sufficiently low mass and/or small parasitic vibrations to allow its use on the lower end of a piezo-tube on a cantilever-based instrument.

The approach demonstrated here allows a cantilever-based instrument to be improved, with fast actuation and operation in nested or parallel feedback loops.

In another aspect, the scheme described here provides a cantilever-based instrument with the ability to cancel vibrations originating from internal operations of the instrument or from external sources, shocks, disturbances or noise.

Another feature of the developments described here is that vibration at one or more locations in the cantilever-based instrument can be sensed and actively damped with actuators designed into the instrument.

A characteristic of the technique and physical implementation of it discussed here is that both the sensing and actuation can be incorporated into a single device so that the design and implementation of the active damping is simplified and cost and complexity is reduced.

This technique is useful for damping relative vibrations between different points of the instrument.

An advantage of the instrumentation and techniques described here is that they provide, through active control of the damping, enhanced performance that is substantially independent of the mass of the object being actuated.

A further advantage of the provide information to the operator on how well the active control of vibration is performing and to allow the operator to modify the instrumental environment or operating parameters to optimize performance.

BRIEF DESCRIPTION OF THE DRAWINGS

FIGS. 12A-12E—Compensated Z for Dimension type AFM show an implementation compatible with a scanning tip version of an atomic force microscope.

DETAILED DESCRIPTION

Figure 1:
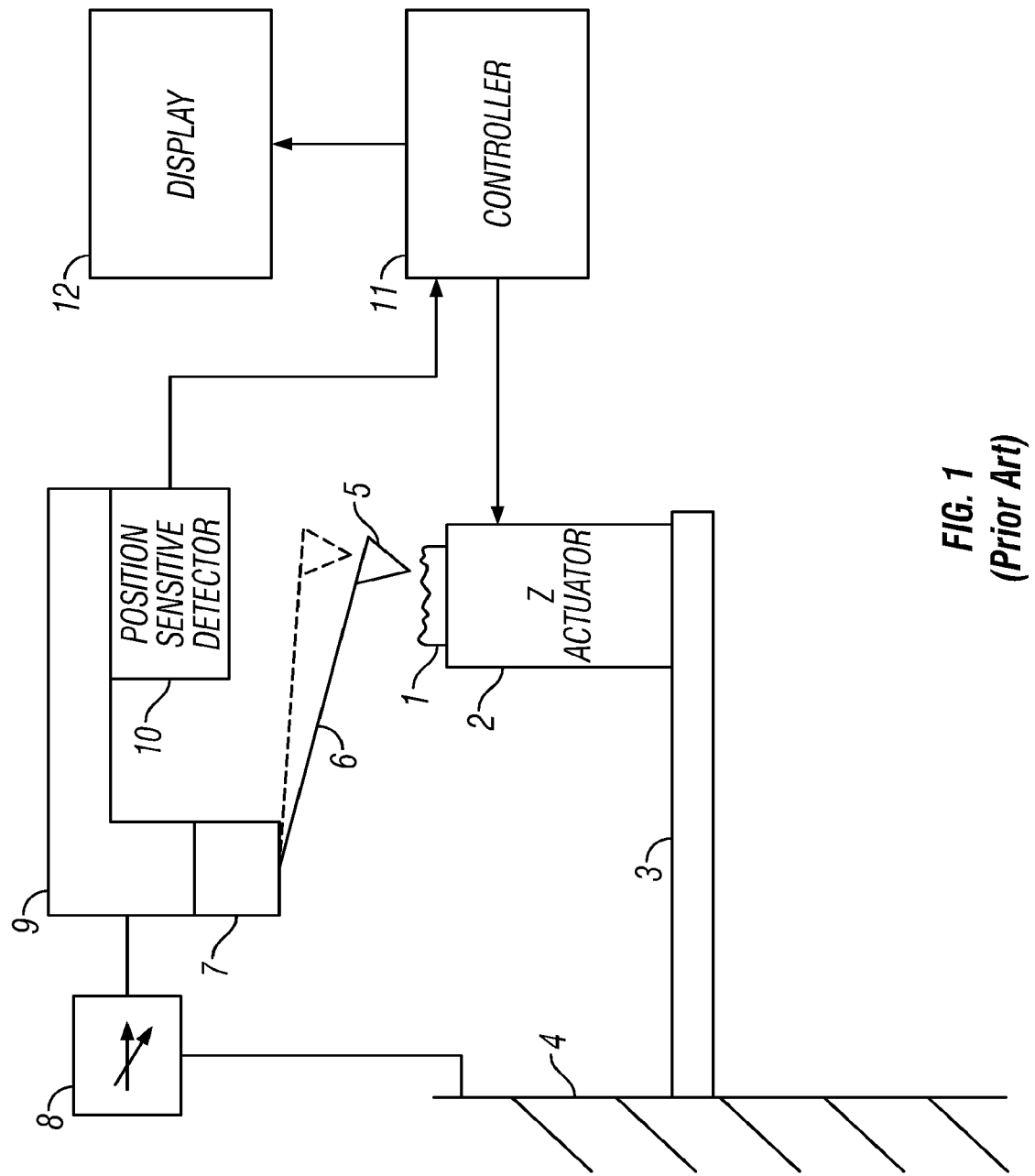
FIG. 1—Actuated Sample depicts a prior art single z-axis actuator.
Figure 2:
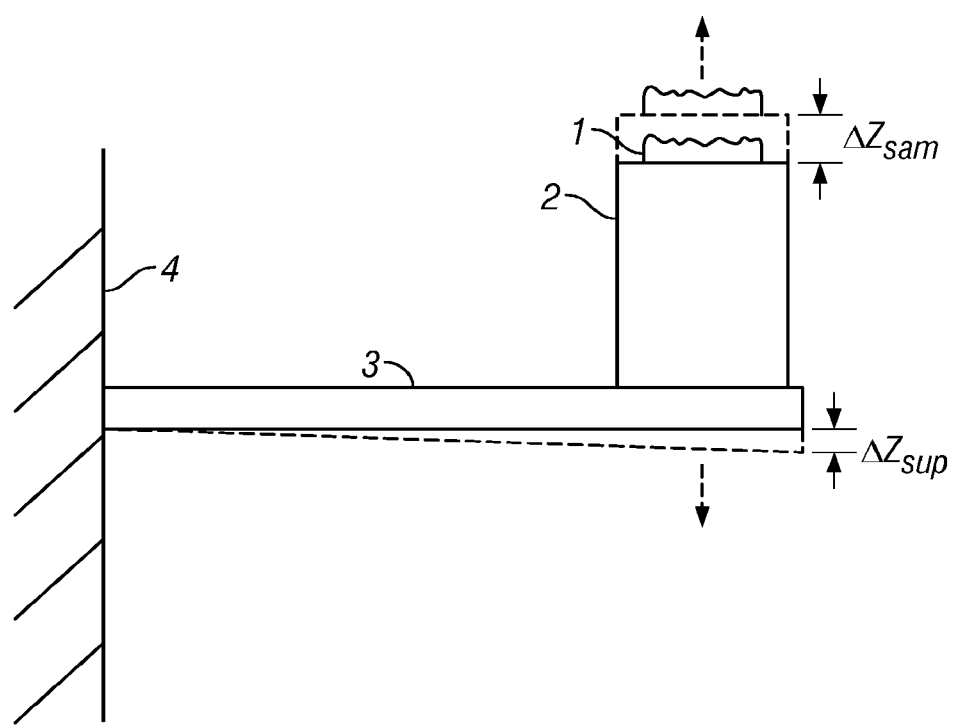
FIG. 2—Reaction Forces shows the behavior of a z-axis actuator and its support structure.

Cantilever-based instruments include such instruments as atomic force microscopes, molecular force probe instruments (1D or 3D), high-resolution profilometers and chemical or biological sensing probes. The embodiment describes atomic force microscopes (AFMs). The embodiments encompass these devices as well as any other metrology instrument that can be used in nanoscale applications.

According to an embodiment, any mechanical oscillations in the atomic force microscope support structure is measured. A damping force is applied with the goal of preventing the parasitic oscillations from degrading performance. Active damping of the support structure enables extremely accurate scanning of even the smallest surface features and even at high scan speeds where conventional actuators suffer from poor performance.

Embodiments can be used with cantilever-based instruments, that is, an apparatus having a probe for characterizing a sample. The apparatus may have an x-actuator, a y-actuator and a z actuator as in an atomic force microscope. Actuators are commonly used in atomic force microscopes, for example to raster the probe or to change the position of the cantilever base relative to the sample surface. The actuators provide relative movement between the probe and the sample. For different purposes and different results, it may be useful to actuate the sample, or actuate the tip or actuate some combination of both.

Sensors are also commonly used in Atomic force microscopes. They are used to detect movement of various components of the atomic force microscope, including movement created by actuators.

For the purposes of the specification, unless otherwise specified, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators. The term "position sensor" or "sensor" refers to a device that converts a displacement, velocity or acceleration into an electrical signal, including capacitive sensors, inductive sensors (including eddy current sensors), differential transformers, variable inductance, optical interferometry, optical deflection detectors (referred to above as a PSDs), strain gages, piezo sensors, magnetostrictive and electrostrictive sensors.

The apparatus may also have only a z-actuator such as in a profilometer or the Molecular Force Probe-1D product manufactured by Asylum Research. In these cantilever based instruments, these and other goals are achieved according by a probe (or sample) holder that includes a fast actuator assembly operated in a fast feedback loop and that also includes an active feedback loop and secondary actuator that damps parasitic oscillations in the assembly.

If the fast actuator assembly has low mass, and is therefore able to displace the probe more rapidly, and is mounted on a larger, higher mass conventional actuator, it could be operated in a fast feedback loop, either nested with the feedback loop of the conventional actuator or in a parallel feedback loop.

The fast actuator assembly comprises first and second fast actuators sometimes referred to herein as a z-actuator and secondary (or compensation or damping) z-actuator. There may alternatively be additional actuators. The actuators can be arranged so that the fixed ends are attached to a common support. If they are attached on opposite sides of the support, for example the top and the bottom, the top end of the top actuator and the bottom end of the bottom actuator are both free to move. In an embodiment, the measurement probe, for example the probe of an atomic force microscope cantilever, is attached directly or through intermediate mounting to the bottom end of the bottom actuator which is positioned closely the sample. A counterbalance mass may or may not be attached to the top end of the top actuator. One or both of the actuators may also be preloaded in a flexure and arranged to cause the flexure to bend in response to actuation forces. Through this geometry and a feedback loop, the top and bottom actuators are arranged to move in opposite directions. The feedback loop causes motion in the support structure to be damped by the top (secondary) actuator.

In another embodiment, the sample is carried by the top actuator and the bottom actuator acts as the secondary actuator. The principal is the same however. The feedback loop causes the bottom (secondary) actuator to damp oscillations in the support structure.

For purposes of illustrating the damping embodiment, one can consider a single axis system where the probe is being moved by a z-actuator, which is the bottom actuator. An atomic force microscope may have interaction between the probe and the sample. A feedback loop may be used to maintain this interaction at some preset level. This feedback loop will control the z-actuator, which in turn will regulate the probe-sample distance to maintain the interaction at the preset level with a preset bandwidth. Alternatively, the probe position may be controlled in a manner independent of a feedback loop, or with feedback that is triggered at a discrete event. Examples of the former include force-distance curves and oscillatory driving of the probe. Examples of the latter include triggered force distance curves and measurement modes where the probe position is positioned at a distance relative to sample topography measured with a feedback loop.

When the z-actuator is energized, the probe will move vertically to a desired position. This motion will necessarily impart a reaction force on the support structure which, by Newton's second law will induce motion in the support structure. This motion is detected with another sensor which activates a feedback loop controlling a secondary actuator. The feedback loop operates to damp this measured motion in the support structure, thereby reducing parasitic oscillations.

Figure 4:
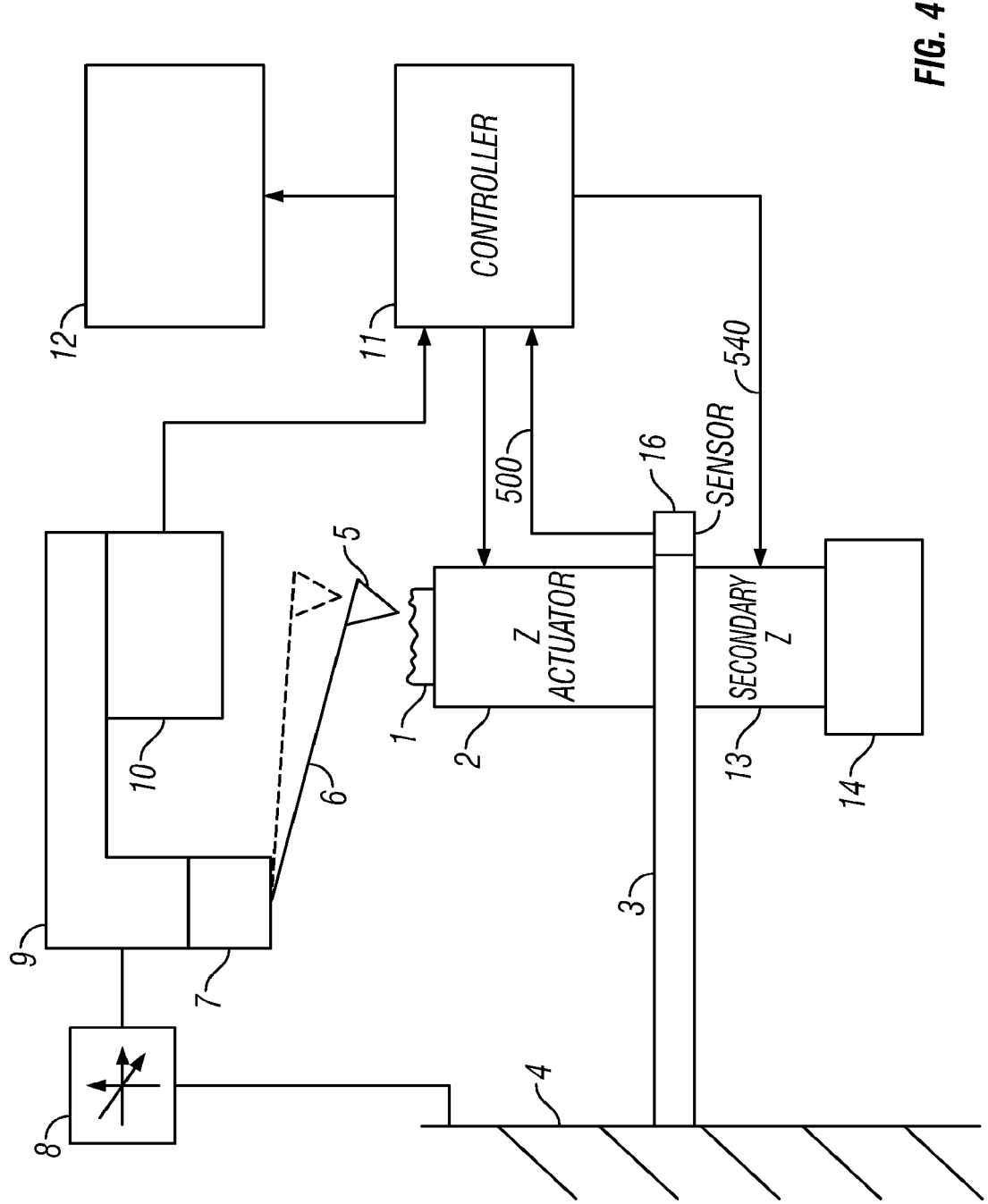
FIG. 4—Damped Actuated Sample shows one embodiment of the current invention.

An embodiment is shown in FIG. 4. Sample 1 is attached to a z-actuator 2 which is supported by a support structure 3 attached to the frame of the instrument 4. Sensor 16 attached to the support structure 3 outputs a signal corresponding to momentum-causing action on the support structure 3 to the controller 111. The actions on the support structure can be movement, acceleration, position and/or velocity provision, for example. The controller 111 uses this signal in a feedback loop that drives the secondary z-actuator 13 to actively damp the vibrations of the support structure 3.

In one embodiment, the secondary z-actuator 13 has a small mass 14 attached to its end which acts as a "test mass" to improve the sensitivity of the sensor 16 to reaction forces in the support structure 3.

When the sensor 16 measures movement in the support structure 3, the controller 111 operates as feedback electronics to move the secondary actuator 13 in a manner to damp the movement in the support structure 3.

Figure 5:
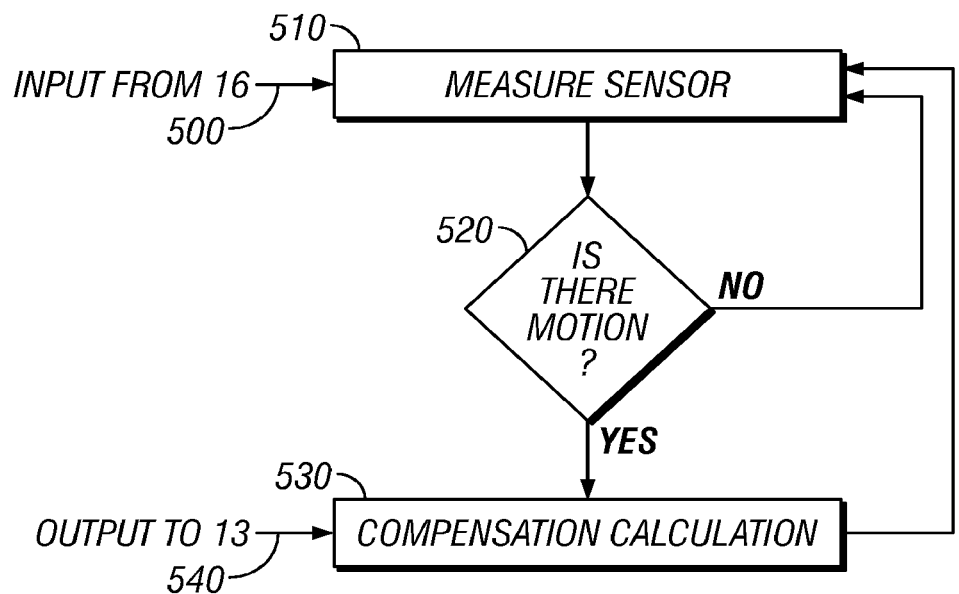
FIG. 5—Compensated Forces shows a feedback procedure for actively damping parasitic oscillations.

FIG. 5 is a flow chart showing the sequence of events beginning with the sensing of movement in the support structure 13 and ending with the damping of that movement. This flowchart may be executed by the controller 111, or via dedicated control circuitry.

FIG. 5 illustrates the input 500 from the sensor 16 being analyzed at 510. 520 determines whether the sensor value indicates that there is motion. If not, then no action is taken, and the flow continues. However, if motion is found at 520, than a compensation calculation is carried out at 530, producing an output 540 to secondary z actuator 13. This compensation produces a value to the actuator 13 that damps the motion.

The active damping approach of the embodiment is quite different than the "balanced" actuator described by U.S. Pat. Nos. 6,459,088 B1 and 6,323,483 B1 in that the steps of measuring the induced motion of the support structure and of actively damping this motion. The prior art balanced actuator is designed such that the momentum transfer to the support structure is "substantially zero". In the embodiment, momentum transfer itself is stopped. If there is substantially zero motion in the support structure, then the sensor does not measure any motion and the feedback loop does not energize the second compensating z-actuator.

Figure 3:
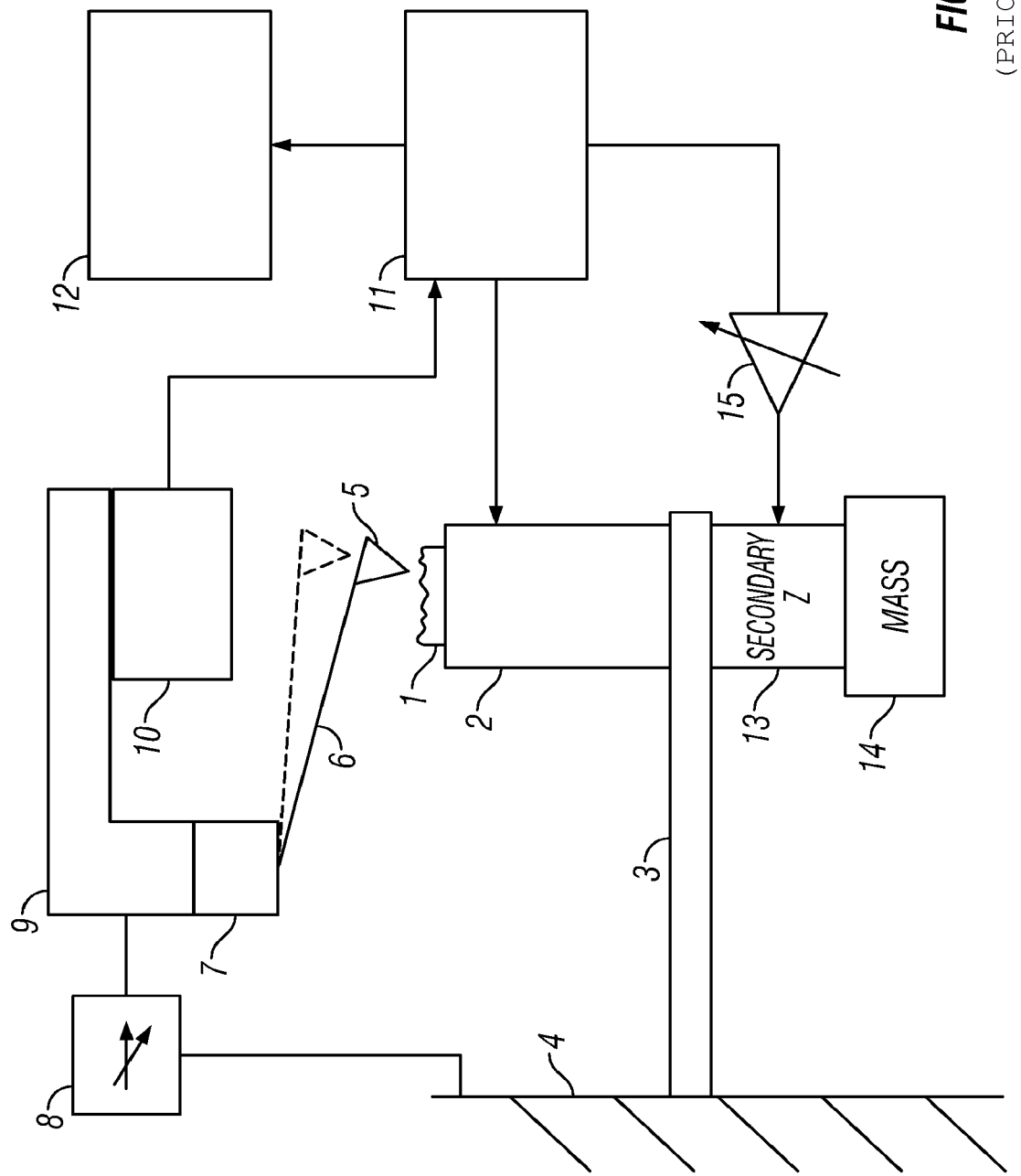
FIG. 3—Balanced Actuated Sample shows a prior art balanced actuator.
Figure 6:
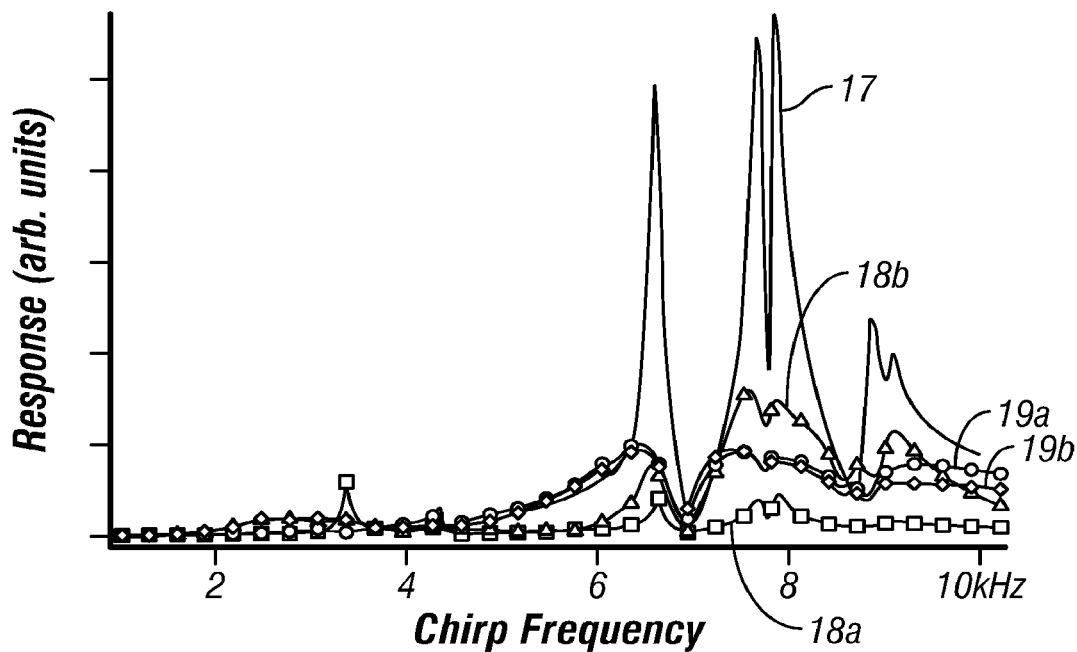
FIG. 6—Response Spectra shows measurements comparing prior art techniques with the active damping method and apparatus.

FIG. 6 shows exemplary measured differences between the approaches diagrammed in FIG. 1, FIG. 3 and FIG. 4. For these measurements, the cantilever probe 5 is brought into contact with the sample 1, in this case freshly cleaved mica. The deflection signal is monitored as the z-actuator 2 was excited at a range of frequencies (or "chirped"). The curves in FIG. 6 show the frequency dependent responses of the probe 5 being excited by the chirped z-actuator 2. Specifically, curve 17 is the response of the PSD 10 when the probe 5 is in contact with the sample 1 and when the z-actuator 2 was excited. FIG. 6 shows large peaks in the response amplitude which correspond to resonances in the support structure 3. These resonances are being driven by the reaction forces between the support structure 3 and the base of the z-actuator 2. For many positioning tasks, including such tasks with Atomic force microscopes, this resonant motion in the support structure may be highly undesirable.

The curve with the open squares 18a shows the response amplitude of a balanced actuator as described in U.S. Pat. Nos. 6,459,088 B1 or 6,323,483 B1, depicted in FIG. 6. As expected from the results described in these patents, the response amplitude 18a of the resonant peaks has been significantly reduced, implying that the momentum transfer to the support structure 3 has been reduced, though it is not identically zero. To obtain a curve closer to zero, it is necessary to manufacture the balanced actuator with higher tolerances, such that their positions and masses and motions cancel each other out more perfectly. This tolerance requirement is a disadvantage of the prior art balanced actuator approach. Nevertheless, the curve 18a is desirable in that the motion of the support structure is reduced.

A disadvantage of this prior art approach becomes apparent when a 3 gram mass is introduced at the sample position. There is a significant change in the frequency response, as shown in the resulting response amplitude curve 18b (closed squares). This curve shows a much larger response, with the now unbalanced actuators 2 and 13 driving the support structure 3 to larger amplitudes at the resonances. This behavior is undesirable and significant. Switching from one sample (or probe) to another, with the samples (or probes) possessing different masses, is common in work with Atomic force microscopes.

An embodiment, which actively damps the sensed motion of the support structure 3 with different samples is shown in curves 19a and 19b. Curve 19a shows the response amplitude with the same sample as curve 18a, the balanced actuator curve. As may be seen, the response amplitude is somewhat larger than that derived from the balanced actuator approach. This is because this embodiment uses the sensor 16 to measure some motion of the support structure 3 before the compensating feedback loop is activated. Nevertheless, the amplitude is still much reduced from the single actuator approach (curve 17). When a 3 gram mass is added, the resulting curve 19b is almost indistinguishable from the original curve 19a, and is better than the equivalent balanced actuator curve (curve 18b).

This demonstrates that the active damping approach can successfully handle changes in the actuated mass. In the same manner, the active method described here will automatically account for changes in actuator sensitivity over time.

A problem with piezo actuators is that their sensitivity can depend on time, temperature and other environmental factors. Active measurement and feedback compensation of the support structure motion will automatically account for this behavior, yielding a system that is very robust.

Sensor noise will affect the efficiency of the active damping approach. Lower noise sensors or multiple sensors placed at critical positions, may give better performance than the balanced actuator approach, even when great care is taken in the manufacture of the balanced actuator. There are almost always practical, real-world effects in the manufacture of these sorts of devices that make it difficult to balance the actuator with precision in all environments. However, this is a strong point of the active damping design. Manufacturing tolerances do not need to be as stringent. Any asymmetry in the construction will be measured by the sensor or sensors. The feedback loop/secondary actuator combination will compensate for the imperfection.

Figure 7:
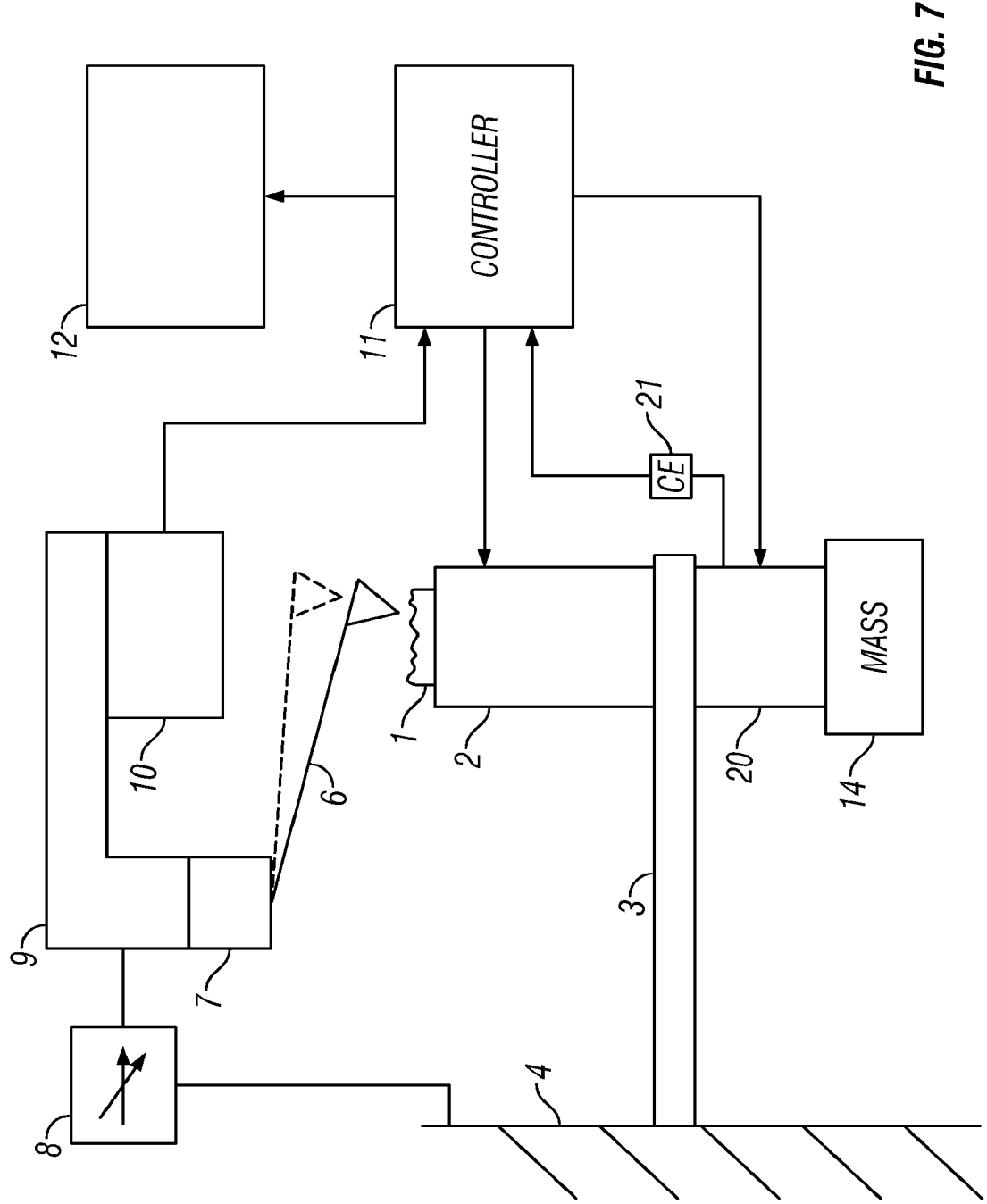
FIG. 7—Self-sensing depicts an embodiment where the secondary actuator is self-sensing.

For some purposes, it may be desirable to simplify the design of instruments employing the active damping approach. One embodiment uses a self-sensing actuator as is depicted in FIG. 7. Here, the sensor 16 and secondary z-actuator 13 of FIG. 4 are replaced with a single dual-purpose device 20. This device 20 acts as both a sensor and secondary z-actuator. Device 20 could be, for example, a piezo stack with external circuitry that both detects the motion of the piezo and responds by controlling that motion. Other technologies could also be employed for this purpose as is well known to those skilled in the art.

The vibrations in support structure 3 sensed by the dual-purpose device 20 and the appropriate response can be controlled by compensating electronics 21, which can be external or internal to the controller 111, but are shown here as external.

Another embodiment uses the controller 111 to control the feedback loop and compensate for the vibrations.

A small mass 114 may optionally be attached to the end of the dual-purpose device 20 as a "test mass" to improve the sensitivity of the device to reaction forces in the support structure 3.

The use of a flexure or clamped end on the dual-purpose device 20 may improve its performance. When the inventors used a piezo stack as the sensor, and attached a small mass to the end as a "test mass" to improve the sensitivity of the stack to the reaction forces in the support structure 3, the result was a peak signal of 20 mV at one of the support structure resonances of 8 kHz. When the same piezo stack was instead clamped and pre-loaded against the support structure, the peak signal increased to over 103 mV, a greater than 6.times. improvement was obtained. Larger signals are advantageous for constructing a more accurate and robust feedback loop as is well known to those skilled in the art.

For stability and selectivity reasons, it may be advantageous to control the bandwidth of the feedback loop. For example, if the primary objective is to control a particular support structure resonance or range of resonances, a feedback loop with a narrow bandwidth surrounding those resonances may be preferable to a wide band feedback loop. Also, depending on the mechanical response of the support structure and sensor and the electronic response of the sensor conditioning, there may be frequency dependent phase shifts in the system that make wide band feedback difficult or impossible. In this case, choosing the bandwidth may improve the performance of the instrument. Compensating at specific frequencies allows the feedback loop to be simplified and to be more robust. There are numerous means of limiting the feedback compensation to a specific range of frequencies including the use of analog and/or digital high-pass, low-pass, or band-pass filters. It may also be advantageous to have more than one feedback loop, where one loop is optimized to damp resonances in a certain range and a second loop is optimized to damp resonances in a different range. Additional feedback loops that are specific to different frequency ranges could also be used.

It may also prove advantageous for separate feedback loops to be used for each sensor/actuator combination. In this case, the frequency ranges of the feedback loops may or may not overlap. However, the primary job of a given feedback loop is to operate a given sensor/actuator combination. Information from others sensors or actuators could be used in the implementation of these specific feedback loops as well, since it is possible and perhaps even likely there will be mechanical coupling between the various sensors and actuators.

In the prototypes that have been constructed, it has been advantageous to have the resonant frequency of the support motion sensing structure be above that of the support structure itself. This allows the use of a more simple feedback loop to damp the support vibrations. If this is not the case, more complicated feedback schemes such as H-infinity techniques can be implemented to control the support motion even through one or more resonances of the sensor structure.

Typical support structures are often much more complicated than the simple geometry shown in FIG. 4 and FIG. 7. There are many engineering requirements that affect performance, manufacturability and quality that need to be evaluated when designing precision instrumentation of the type considered here. Moreover, understanding the vibrational characteristics of the instrument can be difficult. Thus, for any given support structure, it is useful to evaluate the various vibrational modes that compromise the performance of the instrument and then add active damping to various locations to control it.

Figure 8:
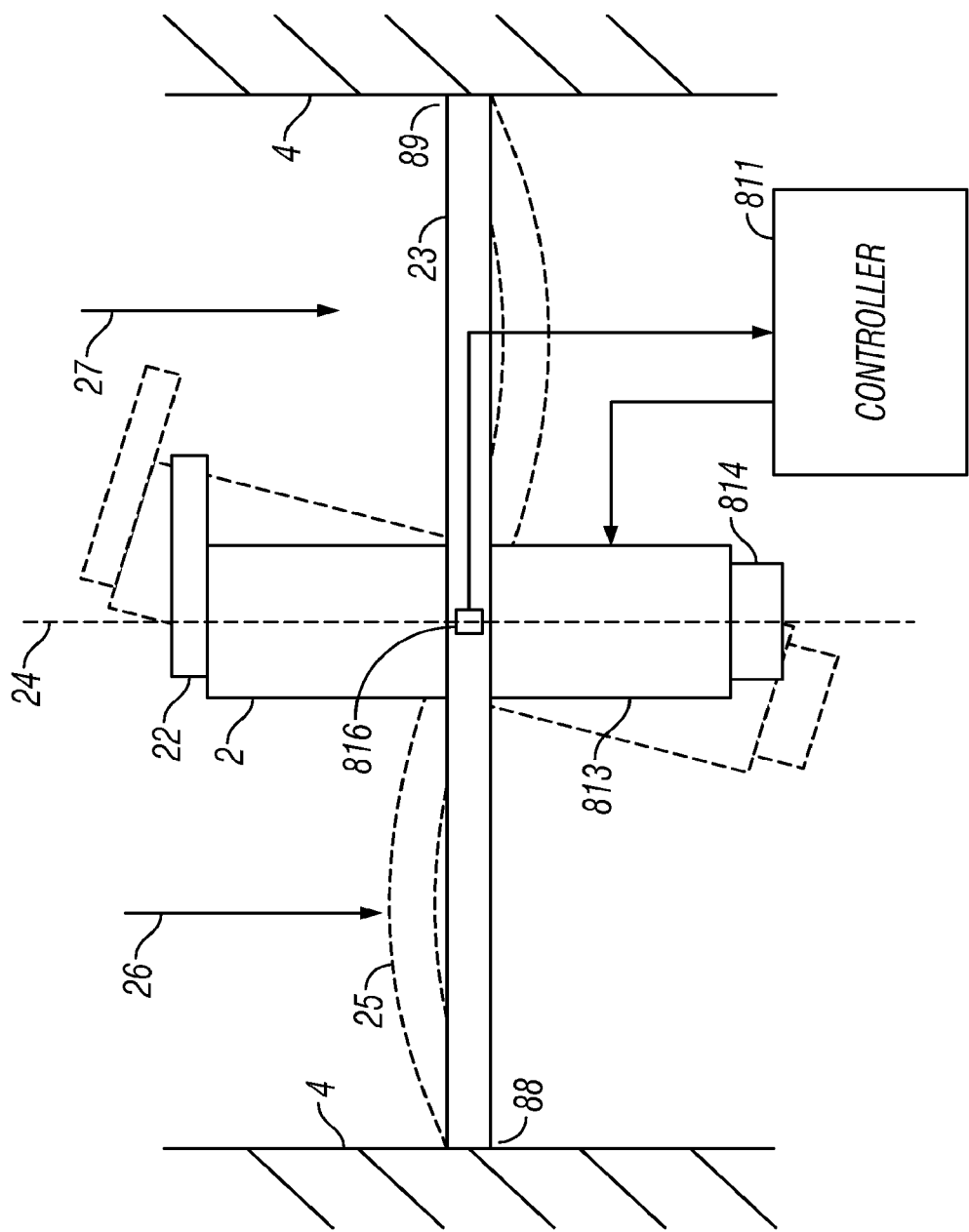
FIG. 8—Higher Modes depicts a situation where modes other than the fundamental are being excited in the support structure.

There are a number of techniques for evaluating unwanted vibrational modes in an instrument during the design phase. These include computer modeling of the structure and measuring movement with a laser vibrometer or other instrument. After such evaluation, the active damping approach of the current invention can be used to selectively damp those vibrations. One embodiment using this approach to address such vibrations is shown in FIG. 8. The FIG. 8 embodiment uses a payload 22 in the place of a sample. The payload is moved in the vertical direction by a z-actuator 2. Unlike the embodiment depicted in FIG. 1, this embodiment attaches the support structure 23 is attached to the frame of the instrument 4 in two places 88 and 89. A motion sensor 816 attached to the support structure 23 detects vertical motion of the support structure 23, sends a signal to a controller 811. Controller 811 in turn sends a signal to damp out the detected motion through the use of a compensation z-actuator 813. In one manifestation, the compensation z-actuator 813 has an additional mass 814 attached to its end which acts as a "test mass" to improve the sensitivity of the motion sensor 816 to reaction forces in the support structure 23. However, the payload 22 might not be symmetric about the vertical axis 24. When the compensation z-actuator 813 is moved, it causes a lateral (torsional) reaction force (torque) to be exerted on the support structure 23. This in turn excites a second mode oscillation, indicated by the dashed structures 25. The second mode oscillations of the support structure 25 have anti-nodes at two particular positions 26 and 27.

Figure 9:
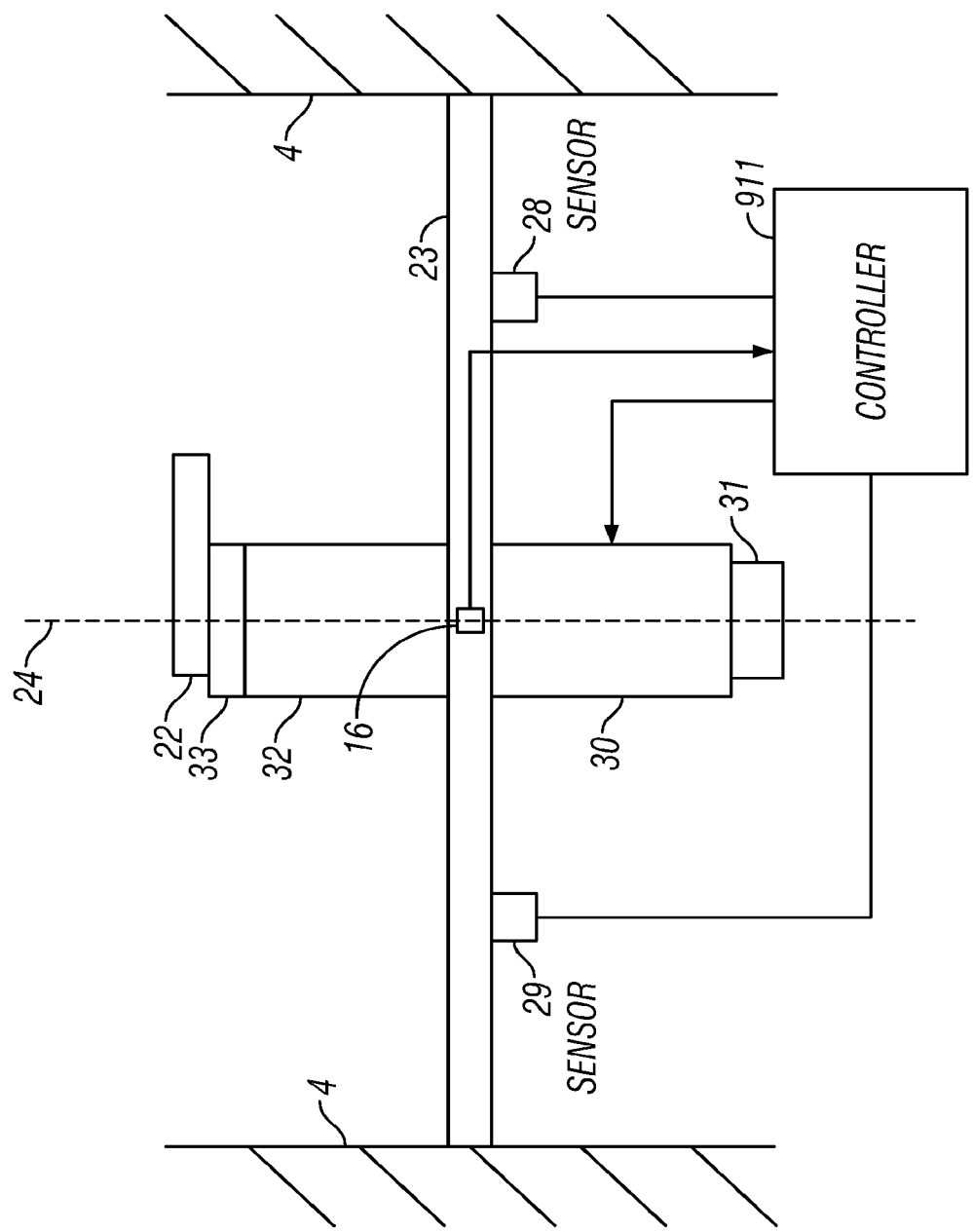
FIG. 9—Higher Mode Damping shows a technique for actively damping the fundamental and higher order modes in a support structure.

The anti-nodes may be the best place to position compensation z-actuators to damp the second mode motion. FIG. 9 illustrates an embodiment using this kind of damping. As with FIG. 8, the parasitic oscillations of the support structure 23 along the vertical axis 24 are damped out by a compensation z-actuator 13. In addition, the embodiment of FIG. 9 includes additional sensors 28 and 29 to measure the motion at their respective positions of second mode oscillations, depicted at locations 26 and 27 in FIG. 8. The signals corresponding to these motions are output to the controller 911 which uses this information to control compensation z-actuators 30 and 32, each with optional added masses 31 and 33 to improve the sensitivity of the motion sensors 16, 28 and 29 to reaction forces in the support structure 23.

While the controller 11 depicted in FIG. 9 is a central unit, the same functionality could be accomplished with distributed controllers, each controlling one or more of the sensor/compensation z-actuator combinations. By controlling the motions of compensation z-actuators 30 and 32, the higher mode oscillations can be damped. Similar performance could be obtained using dual purpose self-sensing actuator, positioned at the anti-nodes 26 and 27. This approach can be extended to any number of vibrational modes of the support structure 23.

Figure 10:
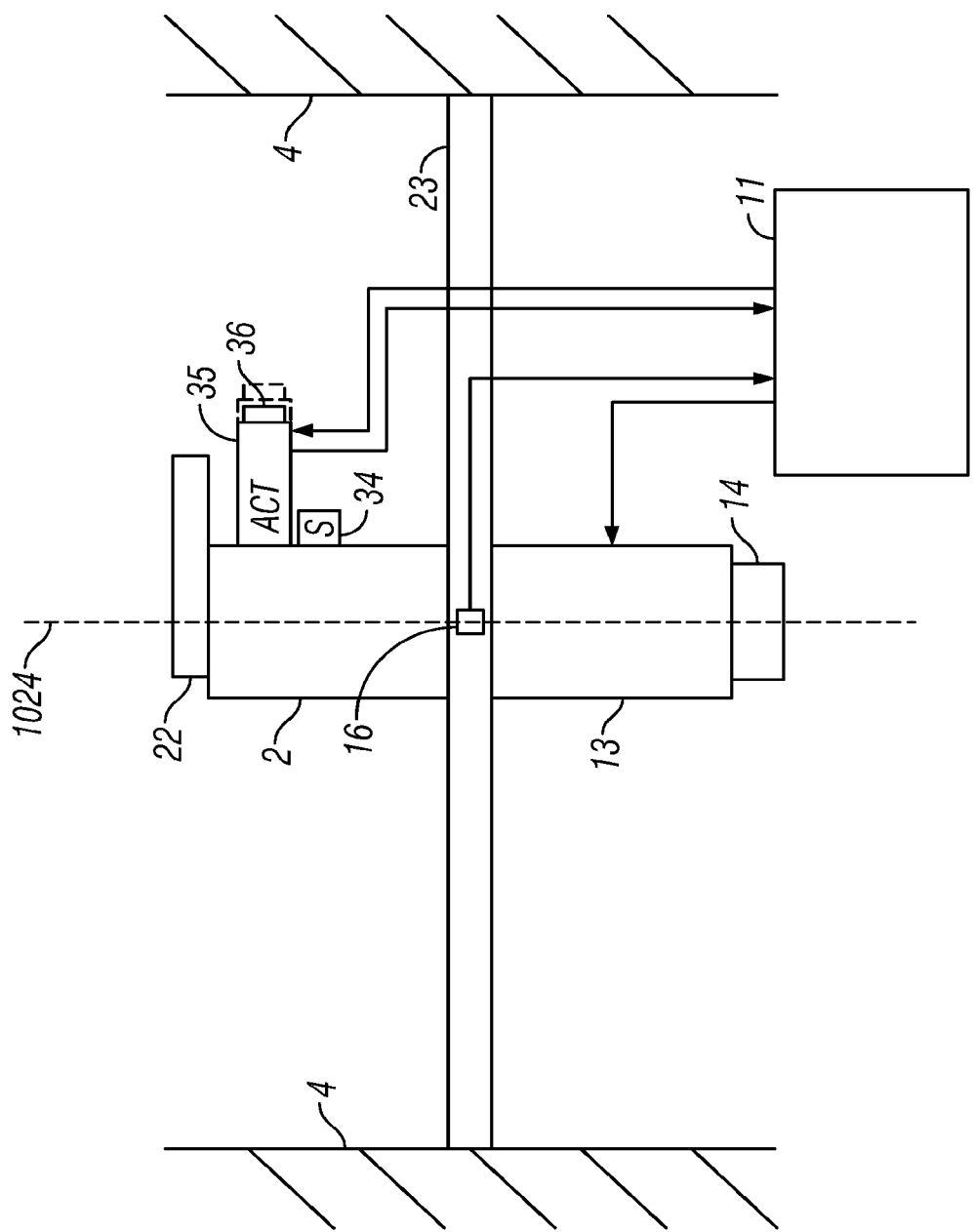
FIG. 10—Higher Mode Damping shows a technique for actively damping an orthogonal mode or modes in a support structure.

Another embodiment of damping other modes is shown in FIG. 10. In this embodiment, the swaying or torsional motion illustrated in FIG. 8 can be compensated with a sensor 34 and actuator 35 arranged with a component orthogonal to the primary axis 1024. In this Figure, the compensation is accomplished with an actuator 34 and an added mass 35. An additional sensor/actuator combination could be deployed parallel and/or perpendicular to the axis 1024.

Figure 11:
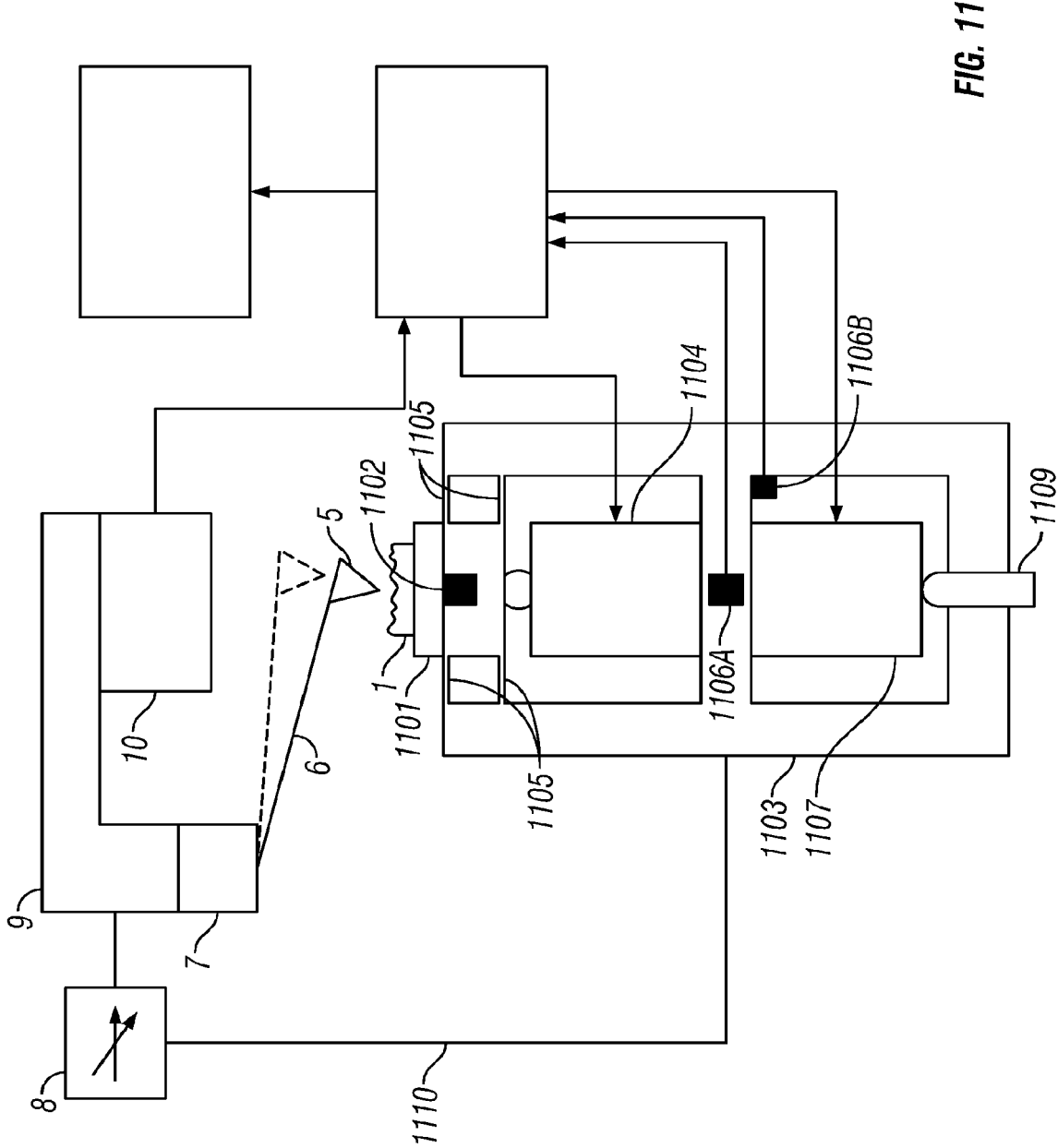
FIG. 11—Flexure Implementation 1 shows an embodiment where the sample is held on a removable puck or holder.

FIG. 11 shows an embodiment where the sample 1 is held on a removable puck or holder 1101. This holder 1101 is optionally fixed to the sample using a magnet 1102 or other mechanism such as the stub clamps of the type used in scanning electron microscope sample stubs of the type well known to those in the art. The sample puck is fixed to a flexure assembly 1103 that contains a primary actuator 1104 similar to the type discussed above. When directed to by the control electronics 11, this primary actuator exerts a force on a portion of the flexure assembly that causes flexure members 1105 to deflect, thus moving the sample along the force axis. A sensor 1106A is fixed near the base of the primary actuator 1104. The output of this sensor measures the displacement, velocity or acceleration of the portion of the flexure assembly 1103 where the primary actuator 1104 is attached 1108. In another embodiment, a different sensor 1106B measures the strain induced between the flexure assembly 1103 and the attachment region 1108. This sensor signal in turn is used by the control electronics 11 to drive the compensating or secondary actuator 1107. The job of this actuator is to damp out vibrations that the sensor 1106A or 1106B measures in the base fixture of the flexure assembly 1103. As with other embodiments, the sensor 1106A or 1106B could actually be multiple sensors. The secondary or compensating actuator 1107 can be a piezo element alone or could carry an extra mass of the type discussed elsewhere in this document. Actuator 1107 can also be preloaded with a fixed or adjustable force implemented with a preload screw 1109 or other device.

The secondary actuator 1107 can also be a non-piezo actuator. Any actuator that is capable of damping the motion measured by the sensor(s) 1106A and/or 1106B can be used. In one embodiment, the entire flexure assembly 1103-1109 is responsible for moving the sample in the vertical or z-direction. It is in turn coupled 1110 to an actuator 8 that provides relative motion between the sample 1 and the probe tip 5.

FIGS. 12A-12E show an implementation compatible with a scanning tip version of an atomic force microscope. This includes the commercially available "Dimension" series, Dimension VX series and "Metrology" series microscopes available from Veeco instruments (Woodbury, N.Y.). This microscope has a removable probe holder and is described for example in U.S. Pat. Nos. 5,714,682 and 6,861,649 and others. The compensated probe holders described in FIG. 12A-12E are designed to replace the probe holders described in the above patents and marketed under the Dimension, Dimension VX and similar trade names from Veeco Instruments.

FIG. 12A shows a view of a probe holder sub-assembly where the cantilever 612 is pointed substantially out of the plane of the paper. FIG. 12B shows the same sub-assembly rotated 90 degrees about the z-axis 1208 of the sub-assembly. A probe 512 attached to a chip 7 is mounted in a pocket 1203. This pocket is in turn attached to a primary actuator 1204. This is attached to a primary central support 1205.

Figure 12C:
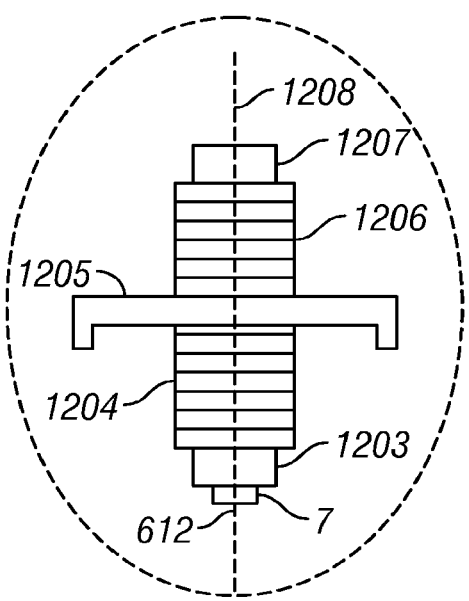
Figure 12C:
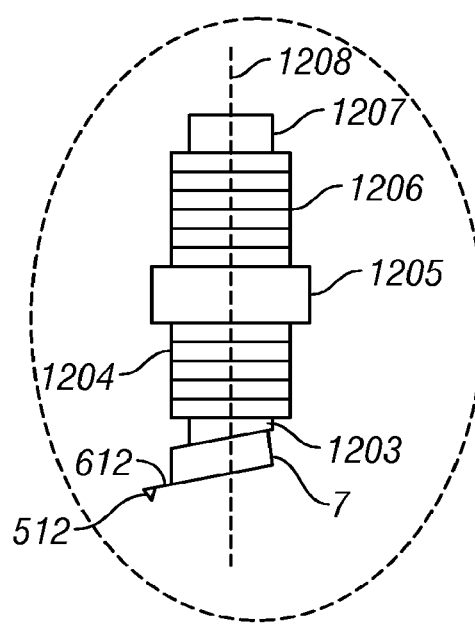
Figure 12C:
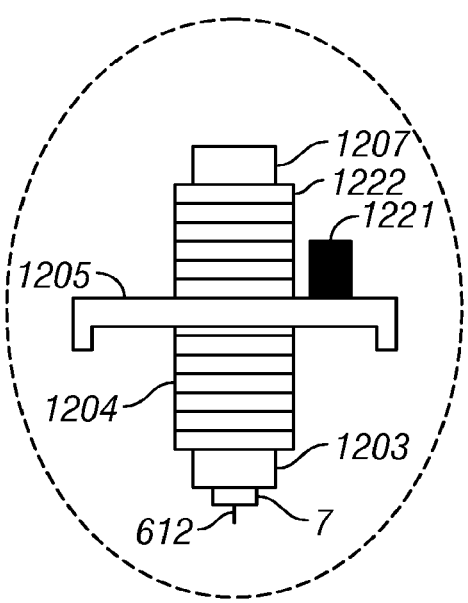

In views 1201 and 1210, the damping of the central support 1205 in response to the motion of the primary actuator 1204 is accomplished with a combined detector/actuator 1206 of the type discussed above. This actuator has an optional reaction mass 1207 attached to it. Instead of a reaction mass, it is possible and in some cases desirable to use a flexure design similar to the embodiments discussed above for the compensation sub-assembly. In this embodiment, the same element 1206 is used to both detect the motion of the central support and to compensate for that motion. FIG. 12C shows a different embodiment where the measurement sensor 1221 and compensation actuator 1222 are separate entities. As with the embodiments discussed above, the signal that is measured, either by 1206 or by 1221, is used in a feedback loop to control the motion of the compensation actuator, either 1206 or 1222.

Figure 12D:
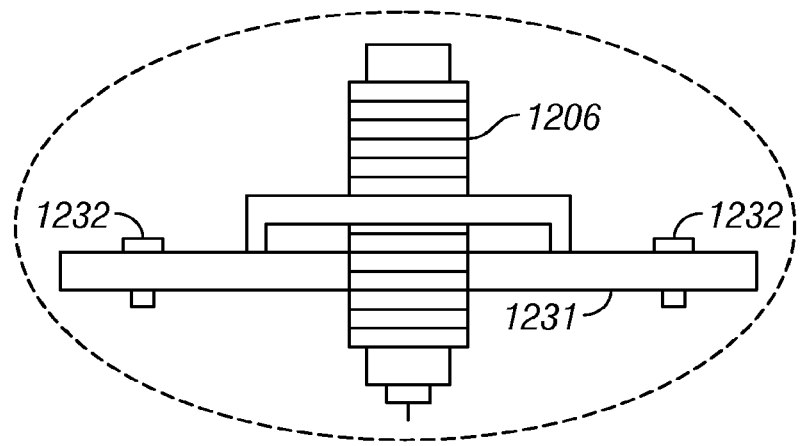
Figure 12E:
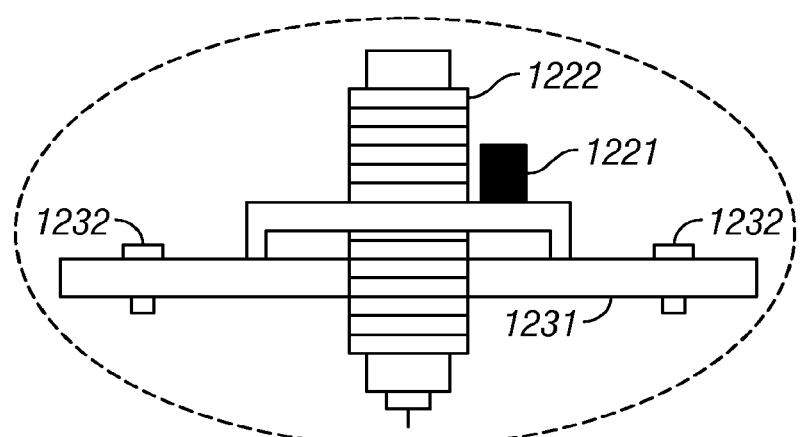

FIGS. 12D and 12E show the sub-assemblies of 1201 and 1220 attached to a base or holder 1231 which defines a plurality of sockets, apertures or pins 1232 designed to allow the entire assembly to be operatively connected to the z-actuator in the Dimension or similar head.

As mentioned above, U.S. Pat. Nos. 6,459,088 B1 and 6,323,483 B1 show a host of methods all with the goal of reducing the momentum transferred to the support to essentially zero. This method has also been used with a number of variations by the group of Ando. The multiple embodiments described herein can also use the general structures described in those references, with the key exception that the embodiments may require an additional sensor for measuring the performance of the feedback damping function. If self-sensing actuators are used, the actuation assembly described in this document may appear to be quite similar to the assemblies discussed in the above references. However, the way the performance is achieved and the functionality is very different.

In one approach to positioning the compensation z-actuators and sensors, the locations are "designed" into the instrument. In another approach, the instrument is first designed and then the modes are experimentally measured, with a motion measurement device, such as a laser vibrometer or a sensor(s) of the type that could be used in the current invention. After the vibrational modes have been measured, active damping sensors and actuators are then deployed into positions to improve or optimize the device performance. For these sorts of applications, self-sensing actuators may be particularly useful.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other applications beyond the measurement field are contemplated.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The controller described herein may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A method, comprising:
   maintaining a feedback loop that maintains a distance relationship between a sample being measured and a support in a sensing system, said feedback loop operating to maintain said distance relationship between said sensing system and said sample that is supported by the support, said maintaining using a first actuator;
   measuring momentum-causing actions that are induced to the support structure by actions of components of said sensing system other than said first actuator; and
   using a second actuator, separate from the first actuator, to compensate said momentum-causing actions to thereby damp said momentum-causing actions.

2. A method as in claim 1, wherein said system includes components of an atomic force microscope and where said components other than the first actuator are other components of said atomic force microscope.

3. A method as in claim 2 wherein said measuring comprises measuring in a constant contact type atomic force microscope.

4. A method as in claim 2, wherein said measuring comprises measuring in a scanning tip atomic force microscope.

5. A method as in claim 1, wherein said sensing system includes a measuring cantilever.

6. A method as in claim 1, further comprising using a controller to determine a compensation based on said measuring, and to use said compensation to produce an output to said second actuator.

7. A method as in claim 1, wherein said measuring and said using are carried out with separate structures.

8. A method as in claim 1, wherein said measuring and said using are carried out with a single structure that produces an output signal based on motion thereof, and which can move based on an applied signal.

9. A method as in claim 1, wherein said measuring comprises determining positions of specified movements by said support, and compensating movements at said positions of said positions.

10. A method as in claim 9, wherein said positions of specified movements are anti-nodes.

11. A method as in claim 1 wherein said using the second actuator comprises using a third actuator that is part of the second actuator and that is oriented in a first direction relative to a direction of motion, and using a fourth actuator that is part of the second actuator and that is oriented orthogonal to said third actuator.

12. A method as in claim 1, further comprising placing said sample on a removable holder, and wherein said measuring comprises measuring motion on the removable holder.

13. A method as in claim 1, further comprising further compensating said actuator using a weight.

14. A method as in claim 1, further comprising attaching a test mass to said second actuator to improve sensitivity of the second actuator to the momentum causing actions.

15. A method as in claim 1, wherein said momentum-causing actions include one or more of movement, positioning, velocity provision and/or acceleration.

16. A method as in claim 1, further comprising placing said sample on a removable holder, and wherein said measuring comprises measuring motion on the removable holder.

* * * * *